United States Patent
Evers-Senne et al.

(10) Patent No.: US 10,176,628 B2
(45) Date of Patent: Jan. 8, 2019

(54) METHOD FOR CREATING A 3D REPRESENTATION AND CORRESPONDING IMAGE RECORDING APPARATUS

(71) Applicant: Testo AG, Lenzkirch (DE)

(72) Inventors: Jan-Friso Evers-Senne, Titisee-Neustadt (DE); Philipp Sasse, Schluchsee (DE); Hellen Altendorf, Kirchzarten (DE); Raphael Bartsch, Langenargen (DE)

(73) Assignee: Testo AG, Lenzkirch (DE)

( * ) Notice: Subject to any disclaimer, the term of this patent is extended or adjusted under 35 U.S.C. 154(b) by 19 days.

(21) Appl. No.: 15/230,768

(22) Filed: Aug. 8, 2016

(65) Prior Publication Data
US 2017/0039760 A1 Feb. 9, 2017

(30) Foreign Application Priority Data
Aug. 8, 2015 (DE) .................. 10 2015 010 264

(51) Int. Cl.
*G06T 15/20* (2011.01)
*G06T 17/10* (2006.01)
(Continued)

(52) U.S. Cl.
CPC .............. *G06T 17/10* (2013.01); *G06T 7/11* (2017.01); *G06T 7/55* (2017.01); *G06T 15/205* (2013.01);
(Continued)

(58) Field of Classification Search
CPC ... G06T 7/001; G06T 7/11; G06T 7/12; G06T 7/30; G06T 7/33; G06T 7/337;
(Continued)

(56) References Cited

U.S. PATENT DOCUMENTS

| 7,289,662 B2 | 10/2007 | Keaton et al. |
| 8,681,150 B2 | 3/2014 | Kim et al. |
| (Continued) | | |

FOREIGN PATENT DOCUMENTS

| EP | 2000953 | 2/2011 |
| WO | 0036564 | 6/2000 |
| WO | 2013017618 | 2/2013 |

OTHER PUBLICATIONS

Li, F., et al. "Parallel image processing for object tracking using disparity information." Second Asian Conference on Computer Vision ACCV'95. 1995.*

(Continued)

*Primary Examiner* — Diane M Wills
(74) *Attorney, Agent, or Firm* — Volpe and Koenig, P.C.

(57) ABSTRACT

In a method for creating a 3D representation of a recording object it is provided, with respect to recorded individual images (2, 3) from a recording object, to identify feature pixels (6, 7, 8, 9) respectively in a computer-aided manner by a feature detection, to calculate in a computer-implemented manner with respect to this feature pixels (6, 7, 8, 9), on the basis of correspondences in terms of content, respectively 3D points (11, 12) and camera poses (3, 4) of the individual images (2, 3), to fit at least one geometric primitive (14) into the calculated 3D points (11, 12) in a computer-implemented manner and to check in a plausibility check (15) whether a minimum discrepancy between the individual images (2, 3) results for the geometric primitive (14), and to output the geometric primitive (14) for which the discrepancy is minimized.

18 Claims, 3 Drawing Sheets

(51) Int. Cl.
*G06T 7/55* (2017.01)
*G06T 17/00* (2006.01)
*G06T 7/11* (2017.01)

(52) U.S. Cl.
CPC .......... *G06T 17/00* (2013.01); *G06T 2200/08* (2013.01); *G06T 2207/10016* (2013.01); *G06T 2207/10028* (2013.01)

(58) Field of Classification Search
CPC .. G06T 7/80; G06T 7/85; G06T 17/00; G06T 17/10; G06T 17/20; G06T 19/00; G06T 19/20; G06T 7/55; G06T 2200/08; G06T 2207/10028; G06T 2207/10016
See application file for complete search history.

(56) References Cited

U.S. PATENT DOCUMENTS

| 2010/0315412 | A1 | 12/2010 | Sinha et al. | |
| 2013/0242054 | A1* | 9/2013 | Chiu | G06T 17/00 348/46 |
| 2014/0037140 | A1* | 2/2014 | Benhimane | G06K 9/6211 382/103 |
| 2014/0043329 | A1* | 2/2014 | Wang | G06T 17/20 345/420 |
| 2014/0160264 | A1* | 6/2014 | Taylor | G02B 21/008 348/79 |
| 2014/0247260 | A1* | 9/2014 | Ghoneima | G06T 19/00 345/419 |
| 2014/0267614 | A1* | 9/2014 | Ding | H04N 13/0275 348/46 |
| 2015/0094952 | A1* | 4/2015 | Moeglein | G06K 9/00671 701/491 |
| 2016/0150211 | A1* | 5/2016 | Hwang | G06T 3/0093 348/43 |

OTHER PUBLICATIONS

Zhang et al. (NPL "A flexible New Technique for Camera Calibration") Citation: Zhang, Zhengyou. "A flexible new technique for camera calibration." IEEE Transactions on pattern analysis and machine intelligence 22.11 (2000), Last Updated Aug. 13, 2008.*
Attene, M. et al., "Hierarchical mesh segmentation based on fitting primitives", Visual Computer, vol. 22, pp. 181-193.

* cited by examiner

METHOD FOR CREATING A 3D REPRESENTATION AND CORRESPONDING IMAGE RECORDING APPARATUS

INCORPORATION BY REFERENCE

The following documents are incorporated herein by reference as if fully set forth: German Patent Application No. 102015010264.8, filed Aug. 8, 2015.

BACKGROUND

The invention relates to a method for creating a 3D representation with respect to a recording object.

Methods are known in which measurement data from a recording object are recorded and are input manually into a CAD program in order to generate a 3D representation of the object in this way. Alternatively, it is known to record 3D measurements from the object which contain a multiplicity of measurement points which likewise have to be post-processed manually.

The invention furthermore relates to an image recording apparatus.

SUMMARY

The invention is based on the object of automating the creation of a 3D representation such that manual input steps can be dispensed with as far as possible.

In order to achieve the stated object, the one or more features according to the invention are provided in a method for creating a 3D representation. In particular, therefore, according to the invention, in order to achieve the stated object in a method for creating a 3D representation with respect to a recording object it is proposed that in a recording step a sequence of individual images of the recording object is recorded from a respective camera pose, that in a feature detection step a feature detection is applied to the individual images in a computer-aided manner in order to identify image pixels as feature pixels, that in a 3D calculation step with respect to the feature pixels the camera poses and respectively 3D prints are calculated in a computer-aided manner, that in a fitting step for the 3D points of the feature pixels at least one geometric primitive is fitted in a computer-aided manner, that in a plausibility check the at least one geometric primitive is checked and/or optimized as to whether or until a discrepancy between the individual images is minimized, and in a representation step the geometric primitive with respect to the minimized discrepancy is output. The combination according to the invention of a calculation known per se of 3D points from feature pixels in a sequence of individual images with an automatic fitting of at least one geometric primitive into the calculated 3D points thus makes it possible easily in a computer-aided manner for a user to represent a 3D representation even if only few 3D points are available. This may occur for example if the recording object is substantially homogeneous and therefore has few distinctive properties that are identifiable in a feature detection. By way of example, this may be the case when recording a room wall painted or coated in one color. The subsequent plausibility check according to the invention furthermore makes it possible to attain inaccuracies or shortcomings in the calculation of the 3D points by an improvement or check for plausibility of the fitted geometric primitives. This, too, is particularly advantageous if the recording object has only little structure. The calculation of the 3D points can be carried out for example by a structure-from-motion method or by solving a system of equations describing the feature pixels as images of the associated 3D point.

The invention thus makes it possible to create a comparatively accurate 3D representation from a recording object, for example an article or a space, construction or part of a building, in a simple manner without necessitating a comprehensive manual intervention in the method.

The use of the geometric primitives moreover has the further advantage that a familiar representation is generatable for a user, for example a skilled worker. This is due to the fact that objects constructed by human beings are dominated by straight edges, planar areas and simple geometric objects such as cylindrical columns, for instance. It is particularly expedient, therefore, if the available geometric primitives are kept available and stored as a delimited, parameterizable set.

The invention thus results in a representation that is ascertainable in a simple manner for the user. While in already known systems for automatically capturing geometry, typically, arbitrary point sets or triangle meshes are processed which allow a representation of arbitrary surface shapes, the delimitation according to the invention to geometric primitives which are fitted into previously calculated 3D points enables an intuitive evaluatability of the calculation result. In this way, a data reduction to an amount allowing further processing in practice is additionally achievable for the user.

In one configuration of the invention it may be provided that in the plausibility check in a segmentation step the individual images are segmented in a computer-aided manner. Automatic or computer-aided segmentation steps are known per se here and are advantageously usable. In this case, initial cells, so-called seeds, are often used, and those image pixels of an individual image which correspond to the initial cells in terms of contents and are adjacent to one another and to the initial cell are set into a segment. It is advantageous here that different image contents of the individual images are processable separately from one another. This enables for example a separate processing of different objects in an individual image. It is particularly expedient if the feature pixels are used as initial cells. What can thus be achieved is that interrelated image contents of the individual images that presumably belong to a 3D point calculated according to the invention are assignable to said 3D point.

Alternatively or additionally it may be provided that in the plausibility check in a variation step image pixels of a segment, on the basis of the associated camera pose, are virtually projected onto the at least one geometric primitive in a computer-aided manner. It is advantageous here that additional image information from the individual images is assigned to the geometric primitives under the hypothesis that these details within a segment in the recording originate from the geometric primitive or that part of the recording object which the geometric primitive is intended to represent. This makes it possible in a simple manner to check the plausibility with which the geometric primitive fitted on a trial basis is acceptable. This is owing to the fact that all individual images during the recording should have recorded the geometric primitive fitted on a trial basis—depending on the camera pose—and so tracing back the ray paths in the respective recording should lead to corresponding image values on the recording object.

It is particularly expedient here if the at least one geometric primitive is varied in a computer-aided manner until the discrepancy between image pixels of different individual images projected onto a common partial region of the geometric primitive is minimized. The optimum configuration of an approximation to the recording object by a geometric primitive is thus achievable in a simple manner since a correspondence between the geometric primitive fitted on a trial basis and the actually recorded recording object can arise only under the condition that the image information items which are recorded in the individual images and which are intended to originate from the same partial region of the recording object on account of the respective camera pose correspond.

By way of example, it may be provided that for determining the discrepancy a difference in color and/or brightness values of the image pixels is calculated and summed in terms of absolute value. What is thus achievable in a simple manner is that that geometric primitive for which image pixels of different individual images that correspond to one another in terms of contents on account of the camera poses and the position of the geometric primitive actually have corresponding image contents is accepted as an optimum geometric primitive. A readily handleable criterion is thus provided with which an optimum fitting of a geometric primitive into a set of 3D points is achievable.

Arbitrary geometric bodies or parts thereof are usable as geometric primitives. A reduction of the parameter space is achievable by the use of regular bodies.

In one configuration of the invention it may be provided that in the fitting step a cone envelope part, a cylinder lateral surface part and/or a planar part is used as the geometric primitive. It is advantageous here that these two basic geometric shapes present the most common basic geometric shapes in artificial objects, such that the method according to the invention is advantageously suitable for calculating a 3D representation of articles made by human beings. Preferably, the cylinder lateral surface part, the cone envelope part and/or the planar part are/is bounded. This results in a delimitation of the respective geometric primitive to a spatial region. As a result, a fitting into a locally delimited set of 3D points is achievable in a simple manner. It is particularly expedient here if the cylinder lateral surface part, the cone envelope part and/or the planar part are/is parameterized. In this way, a computer-aided, fully automatic optimization in the manner described is realized particularly simply since the parameters are usable as variation parameters.

In one configuration of the invention it may be provided that in the recording step a pattern is projected onto the recording object. It is advantageous here that artificially additional features which are suitable for the calculation of 3D points in the method according to the invention are generatable on the recording object. The number of 3D points can thus be increased. This improves an accuracy of a calculation of the 3D representation.

In one configuration of the invention it may be provided that a RANSAC method is applied in the fitting step. It is advantageous here that known methods for fitting geometric primitives are usable.

In one configuration of the invention it may be provided that in a point generating step additional 3D points are generated in a computer-aided dense reconstruction. It is advantageous here that the number of 3D points can be increased, as a result of which the accuracy of a fitting of the geometric primitive can again be increased. Preferably, the point generating step is performed after the feature detection step. It is advantageous here that even before the point generating step first 3D points are providable in the described manner of the method according to the invention.

By way of example, it may be provided that the dense reconstruction is effected by a stereo algorithm and/or a rectification. Known methods are thus utilizable as substeps in the method according to the invention.

In one configuration of the invention it may be provided that in an extrapolation step in a computer-aided manner an intersection of extensions of at least two respectively fitted and/or varied geometric primitives is calculated. It is advantageous here that delimitations of the geometric primitives which arise in an undesired manner for example as a result of gaps in the set of the calculated 3D points can be eliminated in a simple manner. In this case, the invention makes use of the fact that articles and objects made by human beings are not just typically composed of geometric primitives, but even have externally smooth surfaces without cracks, gaps or dislocations. The described extrapolation of the fitted geometric primitives thus represents a usable approximation to recording objects recorded in reality. It is particularly expedient if the connection step is carried out after the variation step. It is thus possible to calculate in an automated manner a visualization with which it is evident in a simple manner whether the different fitted geometric primitives match one another.

In this case or in a further configuration it is particularly expedient if in a connection step the at least two extended geometric primitives are connected at an intersection, for example the intersection already mentioned. It is advantageous here that for the computer-aided processing from the geometric primitives fitted independently of one another, an object or model that can be jointly processed further is provided as a 3D representation of the recording object.

In one configuration of the invention it may be provided that one step or a plurality of steps from the group of feature detection step, 3D calculation step, fitting step, plausibility check, segmentation step, variation step, extrapolation step, connection step is/are respectively performed until an end criterion is fulfilled. It is advantageous here that a processing depth is predefinable with the end criterion. It is furthermore advantageous that an automatically processable termination criterion is providable for the respective method steps performed in a loop-like manner. It is particularly expedient if the respective end criterion is respectively dependent on a parameter. It is advantageous here that the end criterion is variable in a simple manner in order for example to realize different computational accuracies and/or different computational times.

In one configuration of the invention it may be provided that respectively a functional dependence of the parameters already mentioned or generally of parameters on a master parameter is kept available. It is advantageous here that a variation of the end criteria is made possible by the variation of an individual master parameter which predefines the individual parameters in accordance with the functional dependence. It is particularly expedient here if the master parameter is altered with respect to a renewed performance of one step or a plurality of steps from the group of feature detection step, 3D calculation step, fitting step, plausibility check, segmentation step, variation step, extrapolation step, connection step. It is advantageous here that the method according to the invention is implementable with different accuracies and/or computational times. The user is thus provided for example with a simple means to decide whether or not an increase in the computational time produces a usable improvement in the accuracy.

In one configuration of the invention it may be provided that at least two steps from the group of recording step, feature detection step, 3D calculation step, fitting step, plausibility check, segmentation step, variation step, extrapolation step, connection step are performed in a manner overlapping in time. It is advantageous here that the user—for example in real time—can track the generation of a 3D representation while other parts of the method according to the invention are not yet concluded. By way of example, the recording step and the feature detection step can be performed in a manner overlapping in time. In this way, it is possible for a feature detection step to be performed for individual images that have already been recorded while further individual images are being recorded. Consequently, as early as during the recording step the user can carry out additional recordings at locations at which there is an excessively low data density, for example.

In one configuration of the invention it may be provided that in the fitting step and/or in the variation step two or more than two geometric primitives are processed. More complex recording objects are thus simulatable. It is particularly expedient here if the geometric primitives are processed independently of one another and/or temporally in parallel with one another. This enables a parallelized creation of the 3D representation, as a result of which a required time period for creating the 3D representation can be shortened.

In order to achieve the stated object, according to the invention in an image recording apparatus the features of the alternative independent claim directed to an image recording apparatus are provided. In particular, therefore, in an image recording apparatus, in order to achieve the stated object, according to the invention it is proposed to equip the image recording apparatus with an image sensor designed for recording a sequence of individual images, a feature detector designed for applying a feature detection to the individual images and for identifying image pixels as feature pixels, a 3D calculator designed for calculating 3D points with respect to the feature pixels and the camera poses with respect to the individual images, a fitting device designed for fitting at least one geometric primitive for the 3D points of the feature pixels, a plausibility device designed for checking and/or optimizing the at least one geometric primitive until image pixels and different individual images that are assigned to common partial regions of the at least one geometric primitive on the basis of the camera poses have a minimized discrepancy, and comprising an output unit designed for outputting the at least one geometric primitive with respect to the minimized discrepancy. An apparatus for the automated, computer-implemented processing of a method according to the invention is thus provided.

In one configuration of the invention it may be provided that the plausibility device comprises: a segmentation unit designed for segmenting the individual images, wherein the feature pixels are provided and/or used as initial cells (seeds). It is advantageous here that an automatic decomposition of individual images into image contents which correspond to calculated 3D points or are assigned thereto in terms of contents is implementable. Additionally or alternatively it may be provided that the plausibility device comprises: a variation device designed for virtually projecting image pixels of a segment onto the at least one geometric primitive on the basis of the calculated associated camera pose. It is advantageous here that the imaging process that was taken as a basis for the recordings of the individual images is comprehensible for the hypothesis that the at least one geometric primitive is intended to represent an approximation to the recording object or a part thereof and thus a 3D representation of the recording object or a part thereof. It is particularly expedient here if the variation device is additionally designed for varying the at least one geometric primitive until a discrepancy between image pixels projected onto a common partial region of the geometric primitive is minimized. In this way, an automatic improvement of the 3D representation is achievable until the correspondences in terms of contents between the individual images are comprehensible on the basis of the hypothesis of the fitted geometric primitives from the calculated camera poses as a result of the imaging process.

It is particularly expedient if the image recording apparatus according to the invention is designed in the context of a method according to the invention, in particular as described above and/or as claimed in any of the claims directed to a method. For this purpose, the image recording apparatus can comprise means for performing a method according to the invention, in particular as described above and/or as claimed in any of the claims directed to a method.

BRIEF DESCRIPTION OF THE DRAWINGS

The invention will now be described in greater detail on the basis of an exemplary embodiment, but is not restricted to this exemplary embodiment.

In the figures, in a highly schematic basic illustration for elucidating the invention.

DETAILED DESCRIPTION OF THE PREFERRED EMBODIMENTS

Figure 1:
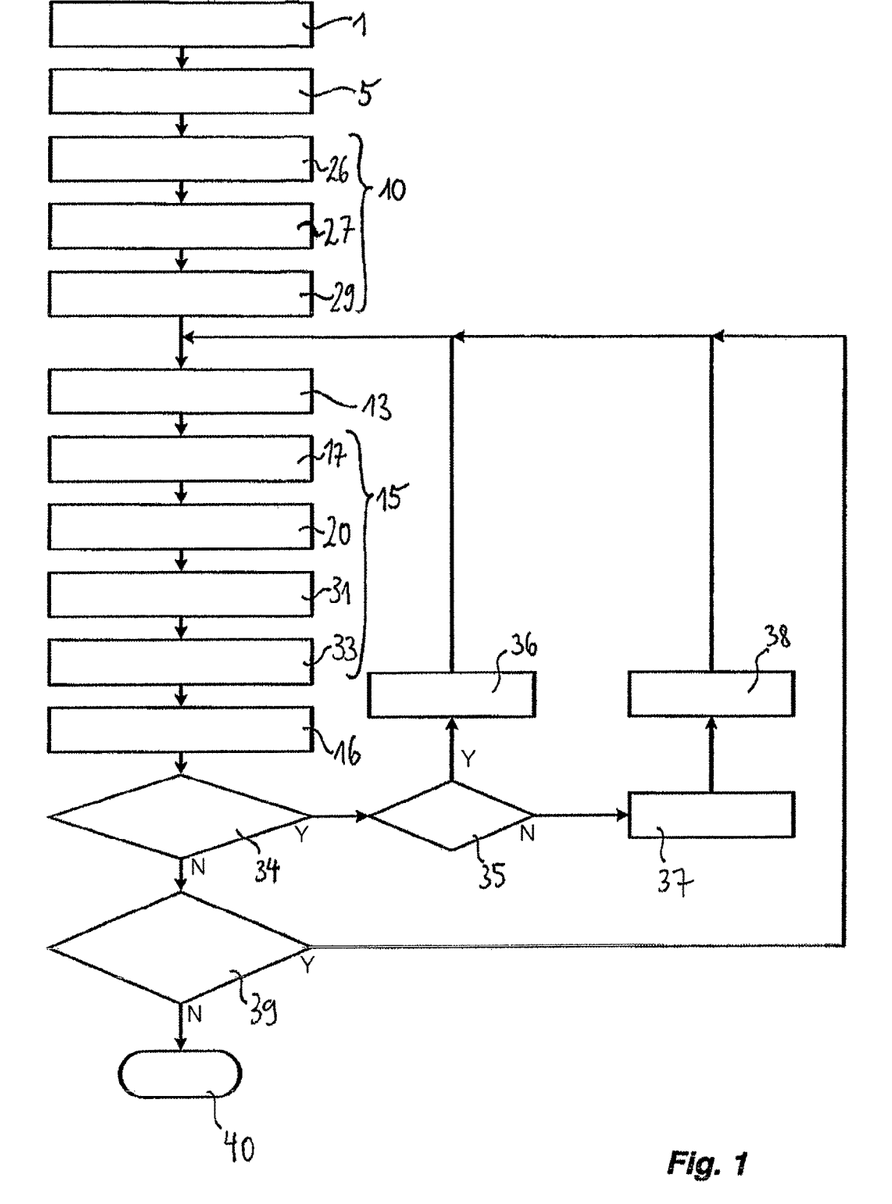
FIG. 1 shows a flow chart of a method according to the invention.
Figure 2:
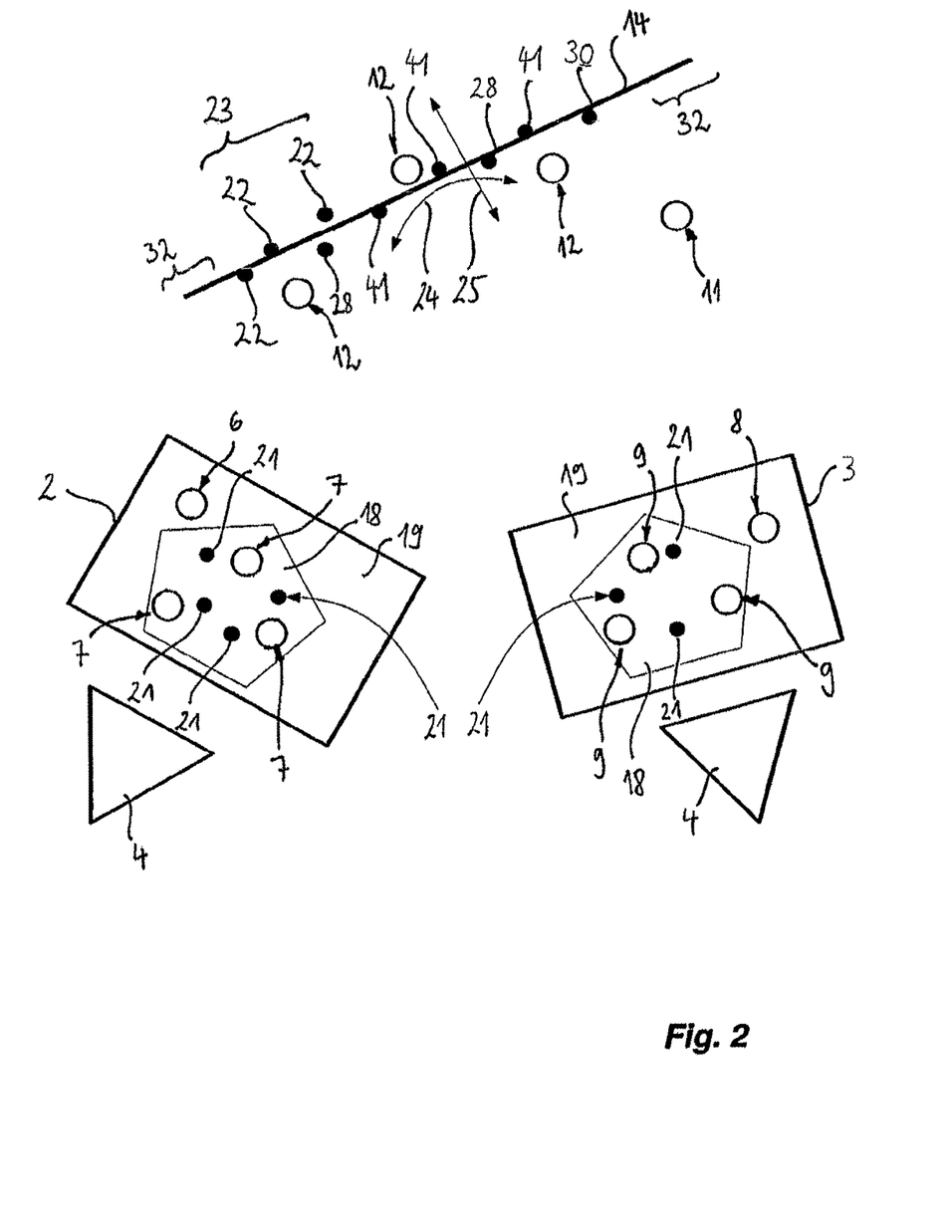
FIG. 2 shows the virtual reconstruction of a 3D representation.

FIGS. 1 and 2 are described jointly below.

In the method according to the invention for creating a 3D representation with respect to a recording object, firstly a sequence of individual images 2, 3 is recorded in a recording step 1. The recording is carried out by a camera known per se, which is not illustrated in further detail and which can be moved between the recordings of the individual images 2, 3, such that the individual images 2, 3 were captured respectively from an individual camera pose 4, 5. For elucidating the invention, two individual images 2, 3 are shown here merely by way of example; in an actual realization of the method a multiplicity of individual images 2, 3 that is significantly greater than two will be recorded.

In a feature detection step 5 after the recordings, in a feature detector a feature detection is applied to the individual images 2, 3 in a computer-implemented manner. As a result, individual image pixels of the individual images 2, 3 are identified as feature pixels 6, 7, 8, 9 and provided for further processing. If the identification of the feature pixels 6, 7, 8, 9 in the individual images 2, 3 has been concluded, then a 3D calculator calculates in a computer-aided manner in a 3D calculation step 10 with respect to the feature pixels 6, 7, 8, 9 respectively a 3D point 11, 12 due to correspondences in terms of contents. It shall be assumed here for the sake of simplicity that the feature pixels 6, 8 produce a 3D point 11 and the feature pixels 7, 9 respectively produce a 3D point 12. The 3D points 11, 12 are then present as three-dimensional position indications.

The number of the identified feature pixels 6, 7, 8, 9 and of the calculated 3D points 11, 12 is chosen in each case to be very small here in order to simplify the elucidation; in actual methods according to the invention, the number of feature pixels 6, 7, 8, 9 is significantly greater than shown here, and so the number of calculated 3D points 11, 12 is significantly greater as well.

The camera poses 4 with respect to the individual images 2, 3 are additionally calculated in the 3D calculation step 10.

After the calculation of the 3D points 11, 12, a geometric primitive 14 is fitted in a fitting step 13 to the calculated 3D points 11, 12 of the identified feature pixels 6, 7, 8, 9. It is evident in FIG. 2 that this fitting does not succeed for the 3D point 11, such that said 3D point 11 is an outlier.

FIG. 2 illustrates the geometric primitive 14 by way of example as a planar part. Cone envelope parts or else cylinder lateral surface parts, for example, are also usable as the geometric primitive 14. Parameters may be provided here for example by an opening angle (vanishing in the case of a cylinder), a height, a radius at the base side, a sector angle or generally by parameterizations of a cone envelope part that are known per se.

The fitting step 13 is performed fully automatically in a computer-aided manner by a fitting device. It should also be mentioned that in the fitting step 13 a RANSAC method (random sample consensus method) is used for fitting and for selecting an appropriate geometric primitive 14.

In a plausibility device, a plausibility check 15 is then checked to establish whether the geometric primitive 14 represents a 3D representation of the recording object with sufficient probability. In a manner that will be described in even greater detail, in this case the geometric primitive 14 is optimized until the individual images 2, 3 for the hypothesis that the geometric primitive 14 represents a 3D representation of the recording object have as far as possible minimal discrepancies among one another.

In a representation step 16 the optimized geometric primitive 14 is output at an output unit.

In this case, in the plausibility check 15 firstly each individual image 2, 3 is segmented into segments 18, 19 in a segmentation step 17 by means of a segmentation device. In this case, the feature pixels 6, 7, 8, 9 are used as initial cells, also called seeds.

FIG. 2 shows by way of example that the feature pixels 7 and respectively 9 in this way lead to a segment 18, while the feature pixels 6 and 8 lead to a segment 19.

Then in a variation step 20 on the basis of the calculated camera poses 4 the feature pixels 6, 7, 8, 9 and also further image pixels 21 are virtually projected onto the geometric primitive 14 in a computer-aided manner by a variation device.

The 3D points 12 thus arise for the feature points 7, 9, while for the further pixels 21 of the respective segment 18 identified as being associated with the geometric primitive 14 further 3D points 22 arise at the intersection points of the projection rays through the further pixels 21 with the geometric primitive 14. In this way, further 3D points 22 arise which lie close together on the geometric primitive 14, and further 3D points 4 arise which are further away from one another.

Those 3D points 22 which lie close together on the geometric primitive 14 and should thus be assigned to a common partial region 23 of the geometric primitive 14 have similar image contents such as brightness and color values.

In the variation step 20, parameters of the geometric primitive 14 which describe for example its spatial position, its size and/or its orientation are then varied, as is illustrated by way of example by arrows 24, 25.

The variation step 20 is performed and repeated in a loop-like manner until an optimum geometric primitive 14 arises for which the discrepancy in terms of contents between the projected image pixels 21, that is to say the further 3D points 22 in the partial region 23, is established in a minimal fashion.

In order to calculate this minimum, the differences in the color and/or brightness values of the projected image pixels 21 are summed in terms of absolute value.

The calculation of the 3D points 11, 12 in the 3D calculation step 10 can be carried out for example by a structure-from-motion method 26 known per se. In order to support this 3D calculation step 10, in the recording step 1 in addition a for example colored pattern can be optically projected onto the recording object. This results in additional features in the individual images 2, 3 which result in additional 3D points 28 in a first point generating step 27. These 3D points 28 are likewise used during the fitting of the geometric primitive 14 in the fitting step 13.

In a second point generating step 29, further additional 3D points 30 are generated by a stereo algorithm and a rectification and are likewise used in the fitting step 13 for selecting the geometric primitive 14.

In the context of the plausibility check 15, after the variation step 20 in an extrapolation step 31 with respect to each optimized geometric primitive 14 an extrapolation or extension 32 is calculated, which is chosen with a length such that an intersection with an adjacent geometric primitive results. The two geometric primitives 14 having an intersection are subsequently connected to one another in a connection step 33.

The steps described up to now are performed in each case until a termination criterion for a desired computational accuracy and plausibility probability is fulfilled. These criteria are individually stipulated in each case for each individual calculation step.

The parameters which describe the respective end criteria are stored in a manner functionally dependent on a master parameter.

In an interrogation step 34 the user is asked whether said master parameter is intended to be altered. If this is the case (alternative "y"), then a further interrogation step 35 asks whether this change in the parameters is intended to apply to the entire quantity of data and thus all complete individual images 2, 3 (alternative "y") or whether the changed master parameter is intended to apply to a selected region (alternative "n").

If the master parameter to be changed is intended to apply to the entire quantity of data, the master parameter is altered as desired in an altering step 36, and the program jumps to before the fitting step 13, in order to perform the fitting step 13 and the plausibility check 15 and also the representation step 16 again.

If the master parameter is not intended to be altered globally for the entire data set (alternative "n"), then firstly a region of the data of the individual images 2, 3 for which the master parameter is intended to be altered is selected in a selection step 37. This can be done by manual input or by automated, computer-aided proposal or by a combination of these alternatives.

Afterward, in an altering step 38 the master parameter is altered for the selected region, and the program once again jumps to before the fitting step 13.

If the answer in the interrogation step 34 is such that no alteration of the master parameter is intended to be effected (alternative "n"), then a further interrogation step 39 interrogates whether individual geometric primitives, area segments or triangle areas are intended to be manually combined.

If this is the case (alternative "y"), then the program is performed again starting from the fitting step 13 with these manually combined area segments or triangle areas.

By contrast, if no manual combination is intended to be performed (alternative "n" with respect to the interrogation step 39), then the program is ended in step 40.

Figure 3:
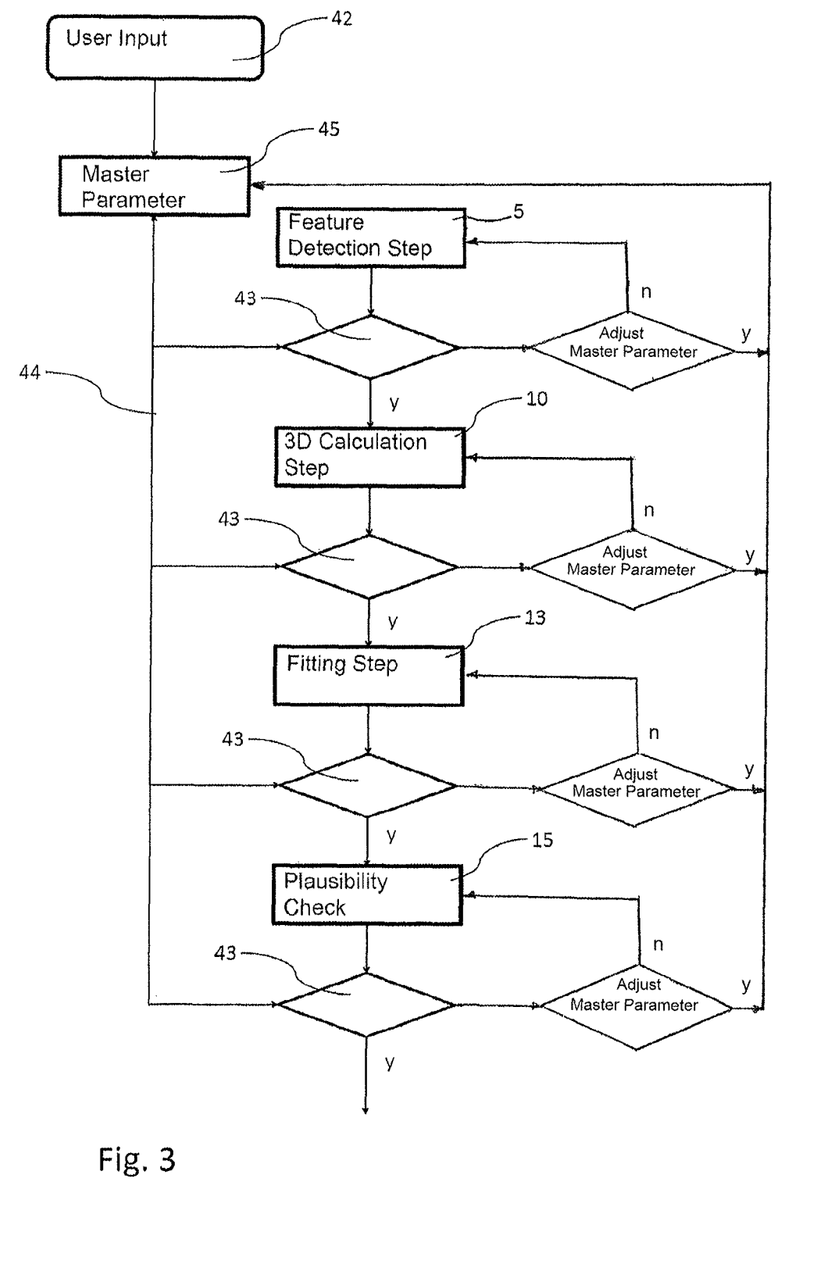
FIG. 3 shows a flow chart of part of the method in which one or more steps are performed repeatedly until an end criterion is met.

In one configuration of the invention represented by the flowchart in FIG. 3, a functional dependence 44 of the parameters already mentioned or generally of parameters on a master parameter 45 is kept available. It is advantageous here that a variation of the end criteria is made possible by the variation of an individual master parameter 45 which predefines the individual parameters in accordance with the functional dependence 44. It is particularly expedient here if the master parameter 45 is altered with respect to a renewed performance of one step or a plurality of steps from the group of feature detection step 5, the 3D calculation step 10, the fitting step 13, or the plausibility check 15, and the selected step(s) are preformed until an end criterion is fulfilled, as indicated at 43. Optionally, the segmentation step 17, the variation step 20, the extrapolation step 31, the connection step 33 could also be included. It is advantageous here that the method according to the invention is implementable with different accuracies and/or computational times. The user can use the user input 42 to select the master parameter 45 as an external input to adjust a level of accuracy of the 3D representation. A simple means to decide whether or not an increase in the computational time produces a usable improvement in the accuracy is thus provided for the user.

For the sake of simplicity, for the elucidation of FIG. 1 the individual steps have been illustrated and elucidated such that they are performed successively in time. In further exemplary embodiments, individual steps, for example the recording step 1 and the feature detection step 5, can be performed in a manner overlapping in time and alternately one after another in order to be able to give the user for example a direct feedback about the necessity for recording further individual images 2, 3.

In the method for creating a 3D representation of a recording object it is provided, with respect to recorded individual images 2, 3 from a recording object, to identify feature pixels 6, 7, 8, 9 respectively in a computer-aided manner by means of a feature detection, to calculate in a computer-implemented manner with respect to said feature pixels 6, 7, 8, 9, on the basis of correspondences in terms of content, respectively 3D points 11, 12 and camera poses 3, 4 of the individual images 2, 3, to fit at least one geometric primitive 14 into the calculated 3D points 11, 12 in a computer-implemented manner and to check in a plausibility check 15 whether a minimum discrepancy between the individual images 2, 3 results for the geometric primitive 14, and to output the geometric primitive 14 for which the discrepancy is minimized.

LIST OF REFERENCE SIGNS

1 Recording step
2, 3 Individual image
4 Camera pose
5 Feature detection step
6, 7, 8, 9 Feature pixel
10 3D calculation step
11, 12 3D point
13 Fitting step
14 Geometric primitive
15 Plausibility check
16 Representation step
17 Segmentation step
18, 19 Segment
20 Variation step
21 Further image pixel
22 Further 3D point
23 Partial region
24, 25 Arrow
26 Structure-from-Motion method
27 First point generating step
28 3D point
29 Second point generating step
30 Further additional 3D point
31 Extrapolation step
32 Extension
33 Connection step
34, 35 Interrogation step
36 Altering step
37 Selection step
38 Altering step
39 Interrogation step
40 End step
41 Further 3D point
42 User input
43 Fulfillment of end criterion
44 Functional dependence of Parameter on Master Parameter
45 Master parameter

The invention claimed is:

1. A method for creating a 3D representation with respect to a recording object, comprising
   in a recording step (1), recording a sequence of individual images (2, 3) of the recording object from a plurality of camera poses (4),
   in a feature detection step (5), applying a feature detection to the individual images (2, 3) in a computer-aided manner in order to identify image pixels as feature pixels (6, 7, 8, 9),
   in a 3D calculation step (10) with respect to the feature pixels (6, 7, 8, 9), calculating the camera poses (4) and respective 3D points (11, 12) in a computer-aided manner,
   in a fitting step (13) for the 3D points (11, 12) of the feature pixels (6, 7, 8, 9), fitting at least one geometric primitive (14) in a computer-aided manner,
   in a plausibility check (15), at least one of checking or optimizing the at least one geometric primitive (14) as to whether or until a discrepancy between the individual images (2, 3) is determined,
   in a representation step (16), outputting the geometric primitive (14) with a minimized discrepancy,
   wherein one or more steps selected from the group of: the feature detection step (5), the 3D calculation step (10), the fitting step (13), or the plausibility check (15), are respectively performed until an end criterion is fulfilled,
   wherein a functional dependence of parameters on a master parameter is kept available, and the master parameter is altered with respect to a renewed performance of one step or a plurality of steps from the group including the feature detection step (5), the 3D calculation step (10), the fitting step (13), or the plausibility check (15), and
   a user input for selecting the master parameter as an external input to adjust a level of accuracy of the 3D representation.

2. The method as claimed in claim 1, further comprising in the plausibility check (15)
in a segmentation step (17), segmenting the individual images (2, 3) in a computer-aided manner using the feature pixels (6, 7, 8, 9) as initial cells.

3. The method as claimed in claim 1, further comprising in a variation step (20), virtually projecting image pixels (21) of a segment (18, 19), on the basis of the associated camera pose (4) onto the at least one geometric primitive (14) in a computer-aided manner, and varying the at least one geometric primitive (14) in a computer-aided manner until the discrepancy between image pixels (21) of different individual images (2, 3) projected onto a common partial region (23) of the geometric primitive (14) is minimized.

4. The method as claimed in claim 1, further comprising for determining the discrepancy, calculating a difference in at least one of color or brightness values of the image pixels (21) and summing the difference in terms of absolute value.

5. The method as claimed in claim 1, further comprising in the fitting step (13), using one or more of: an at least one of parameterized or bounded cone envelope part, a cylinder lateral surface part, or a planar part as the geometric primitive (14).

6. The method as claimed in claim 1, further comprising in the recording step (1), projecting a pattern onto the recording object.

7. The method as claimed in claim 1, wherein a RANSAC method is applied in the fitting step (13).

8. The method as claimed in claim 1, further comprising in a point generating step (27, 29), generating additional 3D points (28, 30) in a computer-aided dense reconstruction using at least one of a stereo algorithm or a rectification.

9. The method as claimed in claim 8, wherein the point generating step (27, 29) is after the feature detection step (5).

10. The method as claimed in claim 1, further comprising in an extrapolation step (31), calculating in a computer-aided manner an intersection of extensions of at least two respectively fitted, varied, or fitted and varied geometric primitives (14).

11. The method as claimed in claim 10, further comprising in a connection step (33), connecting the at least two of the geometric primitives (14) at an intersection.

12. The method as claimed in claim 11, wherein in at least one of the fitting step (13) or the variation step (20), two or more of the geometric primitives (14) are processed.

13. The method as claimed in claim 12, wherein in at least one of the fitting step (13) or the variation step (20), the two or more of the geometric primitives (14) are processed independently of one another and in parallel with one another.

14. The method as claimed in claim 1, wherein one step or a plurality of steps from a group including a segmentation step (17), a variation step (20), an extrapolation step (31), or a connection step (33) are respectively performed until an end criterion is fulfilled.

15. The method as claimed in claim 14, wherein respectively a functional dependence of parameters on a master parameter is kept available, and the master parameter is altered with respect to a renewed performance of one step or a plurality of steps from the group including the segmentation step (17), the variation step (20), the connection step (33), or the extrapolation step (31).

16. The method as claimed in claim 14, wherein at least two steps from the group including the recording step (1), the feature detection step (5), the 3D calculation step (10), the fitting step (13), the plausibility check (15), the segmentation step (17), the variation step (20), the extrapolation step (31), the connection step (33), the recording step (9) or the feature detection step (5), are performed in a manner overlapping in time.

17. An image recording apparatus, comprising an image sensor designed for recording a sequence of individual images (2, 3), a computer configured to detect image features that applies a feature detection to the individual images (2, 3) and identifies image pixels as feature pixels (6, 7, 8, 9), a 3D calculator designed for calculating 3D points (11, 12) with respect to the feature pixels (6, 7, 8, 9) and camera poses (4) with respect to the individual images (2, 3), a fitting device designed for fitting at least one geometric primitive (14) for the 3D points (11, 12) of the feature pixels (6, 7, 8, 9), a plausibility device designed for at least one of checking or optimizing the at least one geometric primitive (14) until image pixels of different individual images (2, 3) that are assigned to common partial regions (23) of the at least one geometric primitive (14) on the basis of camera poses (4) have a minimized discrepancy, and the computer being further configured for (a) carrying out one or more steps selected from the group of: the feature detection step (5), the 3D calculation step (10), the fitting step (13), or the plausibility check (15), are respectively performed until an end criterion is fulfilled, (b) maintaining a functional dependence of parameters on a master parameter, and the master parameter is altered with respect to a renewed performance of one step or a plurality of steps from the group including the feature detection step (5), the 3D calculation step (10), the fitting step (13), or the plausibility check (15), (c) providing an external user input for selecting the master parameter as an external input to adjust a level of accuracy of the 3D representation, and (d) outputting the at least one geometric primitive (14) with the minimized discrepancy.

18. The image recording apparatus as claimed in claim 17, wherein the plausibility device comprises: a segmentation device designed for segmenting the individual images (2, 3), wherein the feature pixels (6, 7, 8, 9) are at least one of provided or used as initial cells, and a variation device designed for at least one of virtually projecting image pixels (21) of a segment (18, 19) onto the at least one geometric primitive (14) on the basis of the calculated associated camera pose (4) or varying the at least one geometric primitive (14) until a discrepancy between image pixels (21) projected onto a common partial region (23) of the geometric primitive (14) is minimized.

* * * * *